(12) United States Patent
Richardson

(10) Patent No.: US 11,083,177 B2
(45) Date of Patent: Aug. 10, 2021

(54) JIG TRAILER FISHING LURE

(71) Applicant: Douglas William Richardson, Newmarket (CA)

(72) Inventor: Douglas William Richardson, Newmarket (CA)

( * ) Notice: Subject to any disclaimer, the term of this patent is extended or adjusted under 35 U.S.C. 154(b) by 265 days.

(21) Appl. No.: 16/420,571

(22) Filed: May 23, 2019

(65) Prior Publication Data
US 2019/0357509 A1    Nov. 28, 2019

(51) Int. Cl.
*A01K 85/18* (2006.01)
*A01K 85/01* (2006.01)
*A01K 85/02* (2006.01)

(52) U.S. Cl.
CPC .............. *A01K 85/01* (2013.01); *A01K 85/02* (2013.01); *A01K 85/18* (2013.01)

(58) Field of Classification Search
CPC ......... A01K 85/18; A01K 85/10; A01K 85/12
USPC .............................. 43/42.15, 42.28
See application file for complete search history.

(56) References Cited

U.S. PATENT DOCUMENTS

| | | | | |
|---|---|---|---|---|
| 1,990,693 A * | 2/1935 | Hildebrandt | ........... | A01K 85/10 43/42.15 |
| 2,199,001 A * | 4/1940 | Khoenle | ................. | A01K 85/10 43/42.28 |
| 2,402,853 A * | 6/1946 | Sweeney | ................. | A01K 85/16 43/42.24 |
| 2,835,067 A * | 5/1958 | Tidwell | ................. | A01K 85/14 43/42.5 |
| 3,046,690 A * | 7/1962 | Woodley | ................. | A01K 85/00 43/42.38 |
| 3,128,572 A * | 4/1964 | McVay | ................. | A01K 85/00 43/42.45 |
| 3,241,261 A * | 3/1966 | Ament | ................. | A01K 85/14 43/42.03 |
| 3,343,296 A * | 9/1967 | Herschel | ................. | A01K 85/00 43/42.28 |
| 3,497,987 A * | 3/1970 | Perrin | ................. | A01K 85/00 43/42.28 |
| 3,864,863 A * | 2/1975 | Neal | ................. | A01K 85/00 43/42.15 |
| 3,914,895 A * | 10/1975 | Mize | ................. | A01K 85/00 43/42.05 |
| 3,996,688 A * | 12/1976 | Hardwicke, III | ...... | A01K 85/00 43/42.09 |
| 4,011,681 A * | 3/1977 | Johnson | ................. | A01K 85/00 43/42.11 |
| 4,470,217 A * | 9/1984 | Adams | ................. | A01K 83/00 43/43.16 |
| 4,930,246 A * | 6/1990 | Cunningham | ......... | A01K 85/00 43/42.28 |
| 4,936,041 A * | 6/1990 | Couture | ................. | A01K 85/14 43/42.15 |
| 5,303,497 A * | 4/1994 | Rabideau | ............... | A01K 85/12 43/42.19 |

(Continued)

*Primary Examiner* — Christopher P Ellis
(74) *Attorney, Agent, or Firm* — PK Patent Law

(57) ABSTRACT

The present invention is directed to a novel jig trailer fishing lure. This novel jig trailer lure has a rigid trailer member of differently weighted segments. During use regular oscillations of the trailer member keep the hook substantially upright whilst the entire jig trailer fishing lure simulates the look and movement and sound of a living prey fish, which a target predator fish is attracted to strike.

20 Claims, 5 Drawing Sheets

(56) References Cited

U.S. PATENT DOCUMENTS

| | | | | |
|---|---|---|---|---|
| 5,524,377 | A * | 6/1996 | Freeman | A01K 85/00 43/42.06 |
| 5,673,508 | A * | 10/1997 | Snyder | A01K 83/00 43/42.37 |
| 5,899,015 | A * | 5/1999 | Link | A01K 85/00 43/42.39 |
| 6,082,038 | A * | 7/2000 | Link | A01K 85/01 43/42.24 |
| 6,240,672 | B1 * | 6/2001 | Huppert | A01K 83/06 43/42.37 |
| 6,922,938 | B1 * | 8/2005 | Ciuffo | A01K 85/00 43/42.15 |
| 7,895,789 | B2 * | 3/2011 | Langer | A01K 85/12 43/42.11 |
| 2006/0037232 | A1 * | 2/2006 | Gill | A01K 83/06 43/42.39 |
| 2008/0236022 | A1 * | 10/2008 | Harrell | A01K 85/00 43/42.39 |
| 2013/0180159 | A1 * | 7/2013 | Smith | A01K 99/00 43/42.22 |
| 2013/0185989 | A1 * | 7/2013 | Langer | A01K 85/00 43/42.11 |
| 2016/0106081 | A1 * | 4/2016 | Thorne | A01K 91/04 43/42.39 |

* cited by examiner

JIG TRAILER FISHING LURE

FIELD OF THE INVENTION

The present invention is a new jig trailer fishing lure.

BACKGROUND OF THE INVENTION

Currently, there are many jig trailer fishing lures being used by anglers. The present invention provides a novel jig trailer lure which uses a novel weighted contoured L-shaped paddle shaped tail portion to maximize and regulate kinetic energy flow through the fishing lure during use, simulating life-like movement and sound of a prey fish, to best attract a target fish, whilst maintaining the hook portion of the fishing lure substantially upright so as to minimize entanglement of the hook in aquatic plant life and debris.

DESCRIPTION

Figure 1:
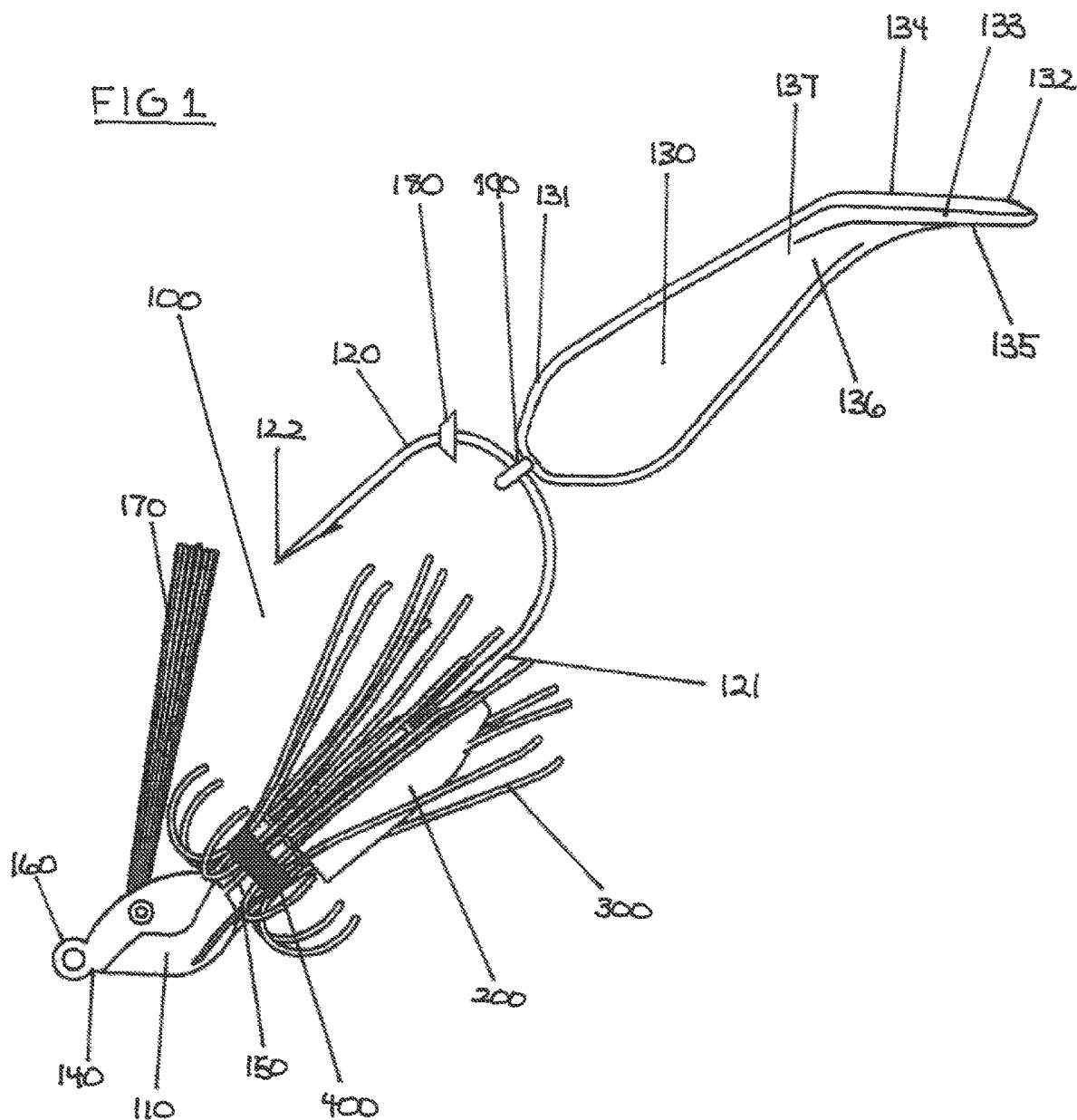
FIG. 1 is a perspective side view of an exemplary embodiment of a jig trailer fishing lure according to the present invention.

In a preferred embodiment, FIG. 1 shows a jig trailer fishing lure 100 in accordance with the invention, comprising a head member 110 fixedly attached to a known hook member 120 cooperatively engaged with a trailer member 130.

In a preferred embodiment, said head member 110 has an anterior end 140 and a posterior end 150. In a preferred embodiment, line attachment means 160 is a known closed loop member fixedly attached to said anterior end 140 to which known fishing line is attached by an angler. In a preferred embodiment said line attachment means 160 is of known stainless steel. In a preferred embodiment a brush guard member 170 is fixedly attached to said head member 110. In a preferred embodiment said brush guard member 170 is comprised of a known stiff nylon filament or plurality of filaments which extends outwardly beyond a sharp end 122 of said hook member 120 to deflect debris and aquatic plant material away from said hook member 120. In a preferred embodiment said head member 110 is substantially ovaloid fabricated of known lead or tungsten and weighs between 7 and 14 grams to optimize kinetic response and depth of sinking of said jig trailer fishing lure 100 in water, weight selection being relative to the size and weight of the targeted species of fish. In a preferred embodiment said head member 110 is decorated and ornamented to mimic a prey fish of the target fish species. In a preferred embodiment said head member 110 is fixedly attached to or molded integral with said hook member 120.

In a preferred embodiment said hook member 120 is selected from known fishing hooks of a size relative to the targeted species of fish and the density of ambient aquatic plant life being fished ("cover"). A larger targeted fish or more dense cover will dictate selection of a higher gauge hook. In a preferred embodiment a known keeper member 180 is attached about the circumference of said hook member 120 to prevent said trailer member 130 from falling off said hook member 120. In a preferred embodiment said keeper member 180 is fabricated of known rubber or known soft plastic.

In a preferred embodiment as shown in FIG. 1, said trailer member 130 is substantially L-shaped, having an anterior end 131 which is the vertical axis of said L-shape, and a posterior end 132 which is the horizontal axis of said L-shape. In a preferred embodiment said anterior end 131 of said trailer member 130 is slidably rotatably attached to and in cooperative engagement with said hook member 120 via tail attachment means 190. In a preferred embodiment said tail attachment means 190 is a known closed loop member, fixedly attached to said trailer member 130. In a preferred embodiment said tail attachment means 190 is fabricated of known stainless steel of sufficient gauge and of a diameter sufficient to enable movement of said trailer member 130 in a horizontal and vertical plane about said hook member 120 as far as said keeper member 180. In a preferred embodiment said tail attachment means 190 is a 0.035 inch steel loop of 16 gauge.

In a preferred embodiment said trailer member 130 is fabricated from solid hard plastic resin of a size and ornamentation selected to resemble the prey fish of the target fish species.

In a preferred embodiment said posterior end 132 of said trailer member 130 is angled at between 25 and 45 degrees downwardly from a horizontal plane of said anterior end 131 of said trailer member 130. In a preferred embodiment, said posterior end 132 of said trailer member 130 has a greater weight than said anterior end 131 of said trailer member 130 with a larger portion of such weight located in a high weight zone 133 of said posterior end 132 of said trailer member 130. In a preferred embodiment said trailer member 130 is fabricated from known hard plastic resin and weighs 7 g and said high weight zone 133 is infused with steel or lead and weighs 2 g such that said trailer member 130 weighs 7 g total. In a preferred embodiment, $2/7$ of the total weight of said trailer member is located in said high weight zone 133. In a preferred embodiment said trailer member 130 is 6 cm, 9 cm or 12 cm long. In a preferred embodiment, the centre of gravity 137 of said trailer member 130 is at a point where said anterior end 131 of said trailer member 130 and said posterior end 132 of said trailer member 130 converge. In a preferred embodiment the weight of said head member 110 is at least the same weight and can be up to two times the weight of said trailer member 130. In a preferred embodiment the weight of said trailer member is 7 g and the weight of said head member 110 is between 7 g and 14 g.

Figure 4:
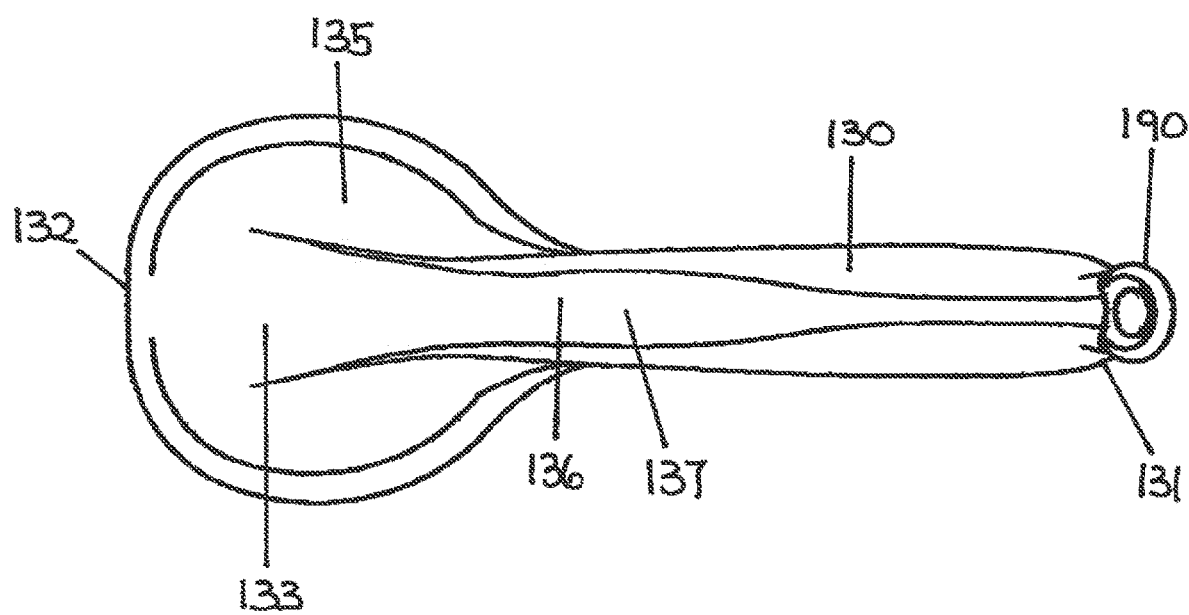
FIG. 4 is a bottom view of a trailer member of a jig trailer fishing lure according to the present invention.
Figure 5:
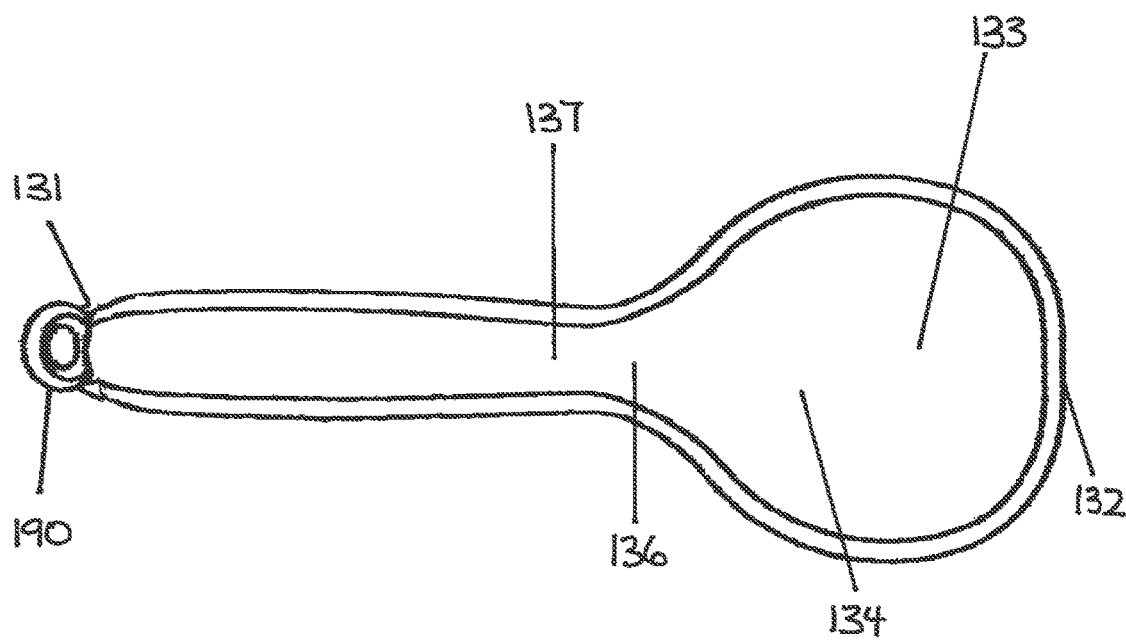
FIG. 5 is a top view of a trailer member of a jig trailer fishing lure according to the present invention.

In a preferred embodiment as shown in FIG. 4 and FIG. 5 said trailer member 130 is also substantially paddle-shaped in addition to being substantially L-shaped.

Figure 2:
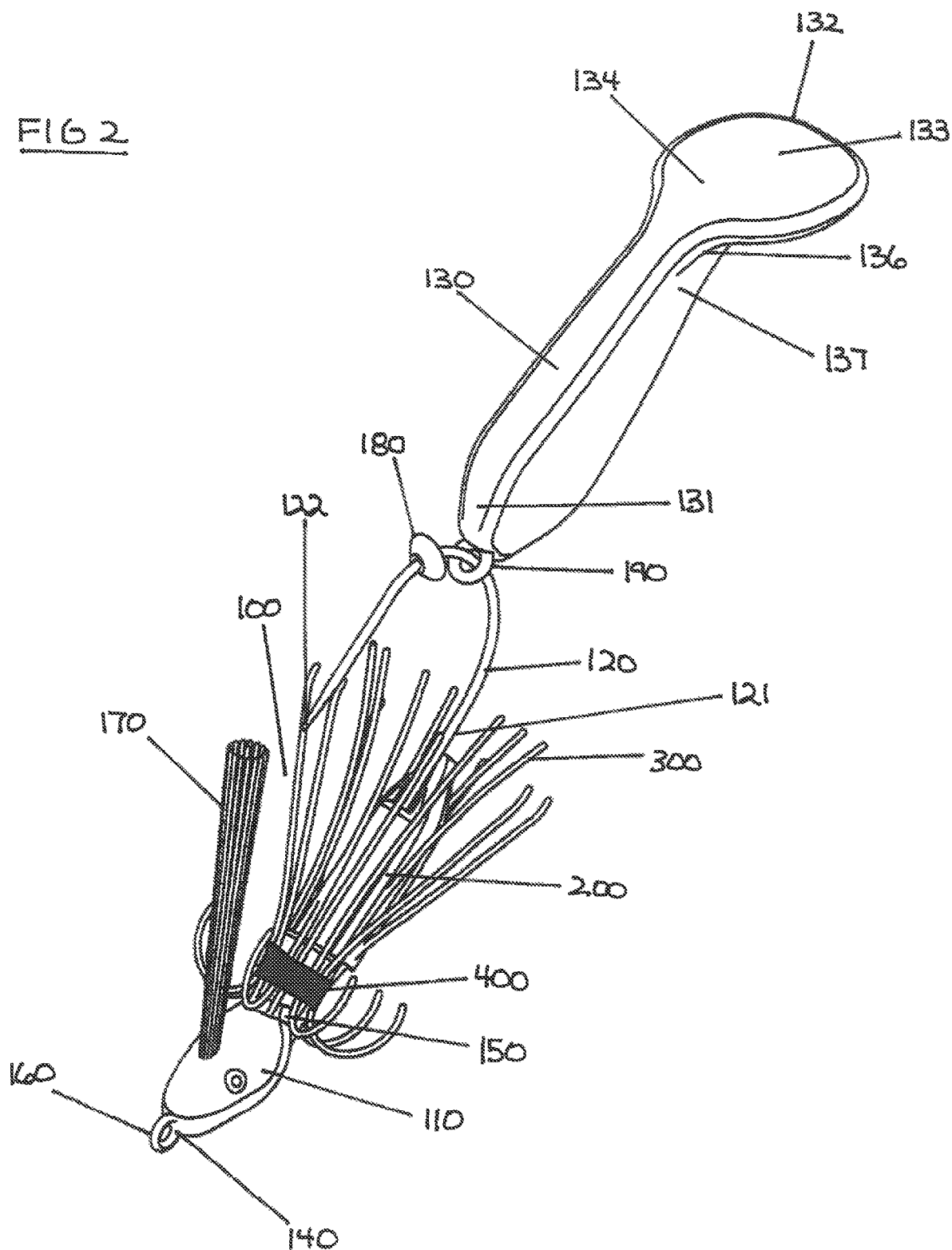
FIG. 2 is a perspective top view of an exemplary embodiment of a jig trailer fishing lure according to the present invention.
Figure 3:
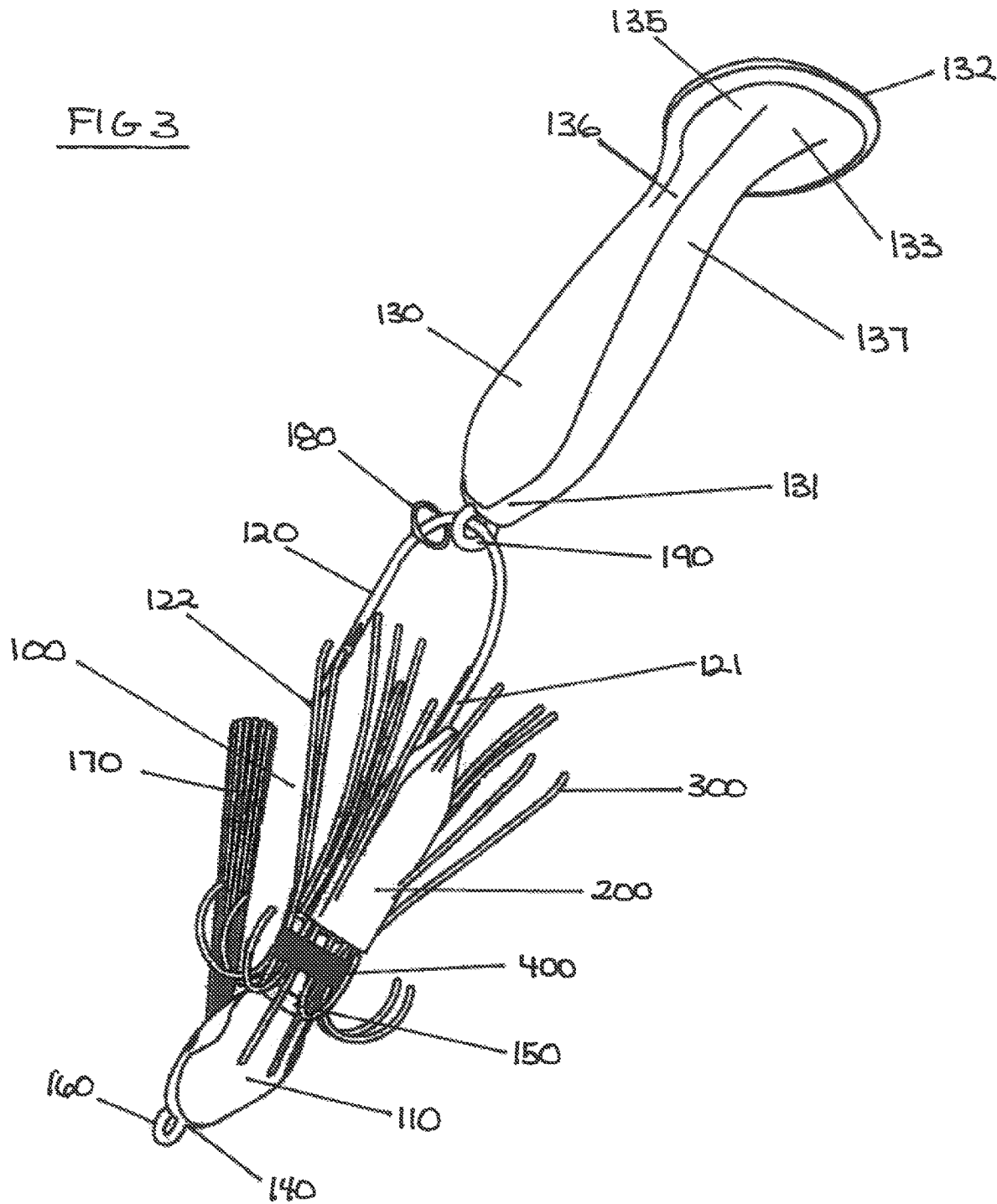
FIG. 3 is a perspective bottom view of an exemplary embodiment of a jig trailer fishing lure according to the present invention.

In a preferred embodiment said trailer member 130 has a superior surface 134 as illustrated in FIG. 5, and an inferior surface 135, as illustrated in FIG. 4. In a preferred embodiment said superior surface 134 is wider than said inferior surface 135 to facilitate water flow from said inferior surface 135 to said superior surface 134 during use. In a preferred embodiment said superior surface 134 is substantially convex, as shown in FIG. 2. In a preferred embodiment said inferior surface 135, as illustrated in FIG. 3 and FIG. 4, has a substantially concave channel running lengthwise along said inferior surface 135, being narrower at said anterior end 131 and widening to its widest point at said posterior end 132. In a preferred embodiment as shown in FIG. 2, FIG. 4 and FIG. 5 said trailer member 130 narrows in width at a neck portion 136 to facilitate water flow from said inferior surface 135 to said superior surface 134 during use. Such shape and contouring of said trailer member 130 optimizes hydrodynamic upward force and flow during use, resulting in optimized oscillation of said trailer member 130 whilst holding said hook member 120 at substantially 90 degrees upwardly relative to a horizontal plane of said anterior end 131 of said trailer member 130.

In a preferred embodiment a known rattle member 200 is fixedly attached to a straight portion 121 of said hook member 120 using known means.

In a preferred embodiment a known skirt member 300 is fixedly attached about said hook member 120. In a preferred embodiment said skirt member 300 is made of a plurality of known silicone filaments of substantially similar length to the length of said hook member 120.

In a preferred embodiment a known collar member 400 is fitted about said hook member 120 and said skirt member 300 preferably near said head member 110 to hold said skirt member 300 to said hook member 120. In a preferred embodiment said collar member 400 is fabricated of rubber.

In use, said jig trailer fishing lure 100 is releasably attached to a known fishing line by an angler tying said fishing line to said line attachment means 160. During use, the angler casts said jig trailer fishing lure 100 into water and drags it in an anterior direction through the water (or, as is known in the art, if the angler is in a boat, the boat's forward movement will cause said jig trailer fishing lure 100 to be moved in an anterior direction through the water). Such periodic movement in an anterior direction generates periodic water pressure lift on an inferior surface 135 of said trailer member 130, which results in periodic oscillation of said trailer member 130 in a vertical and horizontal plane and causing said trailer member 130 to slide along said hook member 120 from a point of commencement towards said sharp end 122 of said hook member 120 as far as said keeper member 180, and then away from said sharp end 122 of said hook member 120, said keeper member 180 preventing said trailer member 130 from sliding off said sharp end 122 of said hook member 120. During such oscillation, kinetic energy is transferred from said trailer member 130 through said tail attachment means 190 to said hook member 120 resulting in shaking of said rattle member 200, causing said jig trailer fishing lure 100 to emanate noise vibrations from said rattle member 200 and from sliding contact of said tail attachment means 190 with said hook member 120, which noise simulates closely the noise and movement generated by forage prey species of the target fish, thereby attracting the target fish, especially in murky water. Bass fish, for example, hear noises of up to 400 Hz, and in a preferred embodiment, the sound frequency emanated by the oscillating jig trailer fishing lure 100 of this invention in use is very attractive to bass fish. Said hook member 120 is held substantially upright perpendicular to the direction of travel of said jig trailer fishing lure 100 by the consistent amplitude of oscillation of said trailer member 130 created and optimized as a result of the relative weight of said trailer member 130 to said jig trailer fishing lure 100, and as a result of weight distribution within said trailer member 130 and the positioning of said high weight zone 133 of said trailer member 130.

In a preferred embodiment during use, periodic anterior movement of said jig trailer fishing lure 100 causes said skirt member 300 to contract during forward movement and flare during movement cessation, further simulating life-like movement of forage prey species of the target fish, thereby increasing attractiveness to the target fish species.

The novel jig trailer fishing lure 100 of this invention closely simulates prey fish movement and sound, which in use proves to be very attractive to target fish species, causing said target fish species to bite said hook member 120. When a target fish bites said hook member 120, said target fish may be reeled in by the angler.

While the invention has been described with respect to specific embodiments by way of illustration, many modifications and changes will occur to those skilled in the art. For instance, said head member 110 and said trailer member 130 may each be crafted in a variety of sizes and weights to create a large or small sized jig trailer fishing lure, to attract large or small sized target fish species respectively. The material of fabrication and decoration of said head member 110 and said trailer member 130 may be chosen to effect additional known functions such as scent or reflection or light emission to further attract target fish species as is known in the art. Said rattle member 200 and said skirt member 300 may be of variable known materials and configurations and sizes depending on the target fish species.

Use of the present invention results in a greater rate of catching of target fish species by anglers. The above description is intended to be illustrative rather than construed in a restrictive sense, and variations to the specific item described may be apparent to skilled persons in adapting the present invention to specific applications where target fish species requires adaptation. Such variations are intended to form part of the present invention insofar as they are within the spirit and scope of the claims below.

What is claimed is:

1. A jig trailer fishing lure comprising:
   a head member;
   line attachment means fixedly attached to said head member;
   a hook member fixedly attached to said head member;
   a substantially L-shaped trailer member having a horizontal axis portion and a vertical axis portion wherein the horizontal axis portion is angled distally from the vertical axis portion at between 135 and 155 degrees and wherein the horizontal axis portion is wider and heavier than the vertical axis portion;
   tail attachment means fixedly attached to said trailer member and releasably, rotatably slidably, cooperatively engaged with said hook member.

2. The jig trailer fishing lure of claim 1 further comprising a rattle member fixedly attached to said hook member or said head member.

3. The jig trailer fishing lure of claim 1 wherein said head member and said hook member are integral with each other.

4. The jig trailer fishing lure of claim 1 wherein a keeper member is slidably affixed about the circumference of said hook member.

5. The jig trailer fishing lure of claim 4 wherein said keeper member is of known rubber or plastic.

6. The jig trailer fishing lure of claim 1 wherein said line attachment means is a stainless-steel closed loop.

7. The jig trailer fishing lure of claim 1 wherein said tail attachment means is a stainless-steel closed loop.

8. The jig trailer fishing lure of claim 1 wherein said head member is substantially ovaloid and fabricated of tungsten or lead.

9. The jig trailer fishing lure of claim 1 wherein a skirt member is fastened about the circumference of said head member.

10. The jig trailer fishing lure of claim 9 wherein said skirt member is comprised of a plurality of silicone filaments.

11. The jig trailer fishing lure of claim 9 wherein said skirt member is fastened to said head member with an elastic collar member disposed over a portion of said skirt member.

12. The jig trailer fishing lure of claim 11 wherein said collar member is of rubber.

13. The jig trailer fishing lure of claim 1 wherein the mass of said trailer member is distributed such that $2/7$ of such mass is disposed in a high mass zone in substantially the centre of the widest portion of said trailer member and $5/7$ of such mass is disposed substantially evenly through the remainder of said trailer member.

14. The jig trailer fishing lure of claim 13 wherein said trailer member weighs 7 grams and is fabricated of 5 grams of known hard plastic resin and 2 grams of steel or lead is infused into substantially the centre of the widest portion of said trailer member.

15. The jig trailer fishing lure of claim 1 wherein said trailer member weighs 7 grams and said head member weighs between 7 and 14 grams.

16. The jig trailer fishing lure of claim 1 wherein said trailer member further comprises a substantially convex superior surface.

17. The jig trailer fishing lure of claim 1 wherein said trailer member further comprises a substantially concave inferior surface.

18. The jig trailer fishing lure of claim 17 wherein said substantially concave inferior surface is a contoured channel that widens incrementally from an anterior end of said trailer member to a posterior end of said trailer member.

19. The jig trailer fishing lure of claim 1 wherein said head member is coloured, decorated and ornamented to resemble a fish.

20. The jig trailer fishing lure of claim 1 wherein said trailer member is coloured, decorated and ornamented to resemble a fish.

\* \* \* \* \*

UNITED STATES PATENT AND TRADEMARK OFFICE
CERTIFICATE OF CORRECTION

| | |
|---|---|
| PATENT NO. | : 11,083,177 B2 |
| APPLICATION NO. | : 16/420571 |
| DATED | : August 10, 2021 |
| INVENTOR(S) | : Richardson |

It is certified that error appears in the above-identified patent and that said Letters Patent is hereby corrected as shown below:

On the Title Page

Column 1 please insert the following data:
-- Foreign Application Priority Data
May 24, 2018 (CA).......................................................... 3006107 --

Signed and Sealed this
Thirteenth Day of December, 2022

Katherine Kelly Vidal
*Director of the United States Patent and Trademark Office*